US011677627B2

(12) United States Patent
Fainberg et al.

(10) Patent No.: US 11,677,627 B2
(45) Date of Patent: Jun. 13, 2023

(54) DYNAMIC SEGMENTATION MANAGEMENT

(71) Applicant: FORESCOUT TECHNOLOGIES, INC., San Jose, CA (US)

(72) Inventors: Ilya Fainberg, Tel Aviv (IL); Mark Kurman, Neve Yarak (IL); David Bar, Tel-Aviv (IL)

(73) Assignee: FORESCOUT TECHNOLOGIES, INC., San Jose, CA (US)

( * ) Notice: Subject to any disclaimer, the term of this patent is extended or adjusted under 35 U.S.C. 154(b) by 4 days.

(21) Appl. No.: 16/023,284

(22) Filed: Jun. 29, 2018

(65) Prior Publication Data

US 2020/0007395 A1 Jan. 2, 2020

(51) Int. Cl.
*H04L 41/0893* (2022.01)
*H04L 41/0213* (2022.01)
*H04L 41/0816* (2022.01)
*H04L 41/12* (2022.01)
*H04L 9/40* (2022.01)

(52) U.S. Cl.
CPC ...... *H04L 41/0893* (2013.01); *H04L 41/0213* (2013.01); *H04L 41/0816* (2013.01); *H04L 41/12* (2013.01); *H04L 63/0209* (2013.01); *H04L 63/20* (2013.01)

(58) Field of Classification Search
CPC ............ H04L 41/0893; H04L 41/0213; H04L 41/0816; H04L 41/12; H04L 63/0209; H04L 63/20
See application file for complete search history.

(56) References Cited

U.S. PATENT DOCUMENTS

| 8,341,717 | B1 | 12/2012 | Delker et al. |
| 2013/0275574 | A1* | 10/2013 | Hugard, IV ............ H04L 41/12 709/224 |
| 2015/0326528 | A1 | 11/2015 | Murthy et al. |
| 2016/0301717 | A1 | 10/2016 | Dotan et al. |
| 2017/0118173 | A1 | 4/2017 | Arramreddy et al. |
| 2018/0159751 | A1 | 6/2018 | Zhang et al. |
| 2018/0176185 | A1 | 6/2018 | Kumar et al. |

(Continued)

OTHER PUBLICATIONS

International Search report for the International Application No. PCT/US2019/052017, dated Nov. 12, 2019.

(Continued)

*Primary Examiner* — Abdulkader M Alriyashi
(74) *Attorney, Agent, or Firm* — Womble Bond Dickinson (US) LLP

(57) ABSTRACT

Systems, methods, and related technologies for segmentation management are described. In certain aspects, an entity communicatively coupled to a network is selected and one or more characteristics of the entity may be determined. A segmentation policy may be selected based on the one or more characteristics of the entity and one or more tags to be assigned to the entity based on the segmentation policy may be determined. A zone for the entity based on the one or more tags may be determined and one or more enforcement points associated with the zone for the entity may be determined. One or more enforcement actions may then be assigned to the one or more enforcement points based on the zone associated with the entity.

19 Claims, 5 Drawing Sheets

(56) References Cited

U.S. PATENT DOCUMENTS

2018/0212768 A1\* 7/2018 Kawashima ........ H04L 63/0876
2019/0253319 A1\* 8/2019 Kampanakis ....... H04L 41/0893

OTHER PUBLICATIONS

International Search report for the International Application No. PCT/US2019/052018, dated Nov. 12, 2019.
International Search Report and Written Opinion for International Application No. PCT/US2019/036106, dated Sep. 8, 2019.
Transmittal of International Preliminary Report on Patentability dated Jan. 7, 2021, for International Application No. PCT/US2019/036106, filed Jun. 7, 2019, pp. 8.
Transmittal of International Preliminary Report on Patentability dated Apr. 8, 2021, for International Application No. PCT/US2019/052018, filed Sep. 7, 2019, pp. 8.
Transmittal of International Preliminary Report on Patentability dated Apr. 8, 2021, for International Application No. PCT/US2019/052017, filed Sep. 19, 2019, pp. 8.

\* cited by examiner

DYNAMIC SEGMENTATION MANAGEMENT

TECHNICAL FIELD

Aspects and implementations of the present disclosure relate to network segmentation, and more specifically, dynamic segmentation management of a communication network.

BACKGROUND

As technology advances, the number and variety of devices that are connected to communications networks are rapidly increasing. Each device may have its own respective vulnerabilities which may leave the network open to compromise or other risks. Scanning of each device on a network can be useful for monitoring or securing a communication network in order to prevent unauthorized or rogue devices from accessing network resources.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
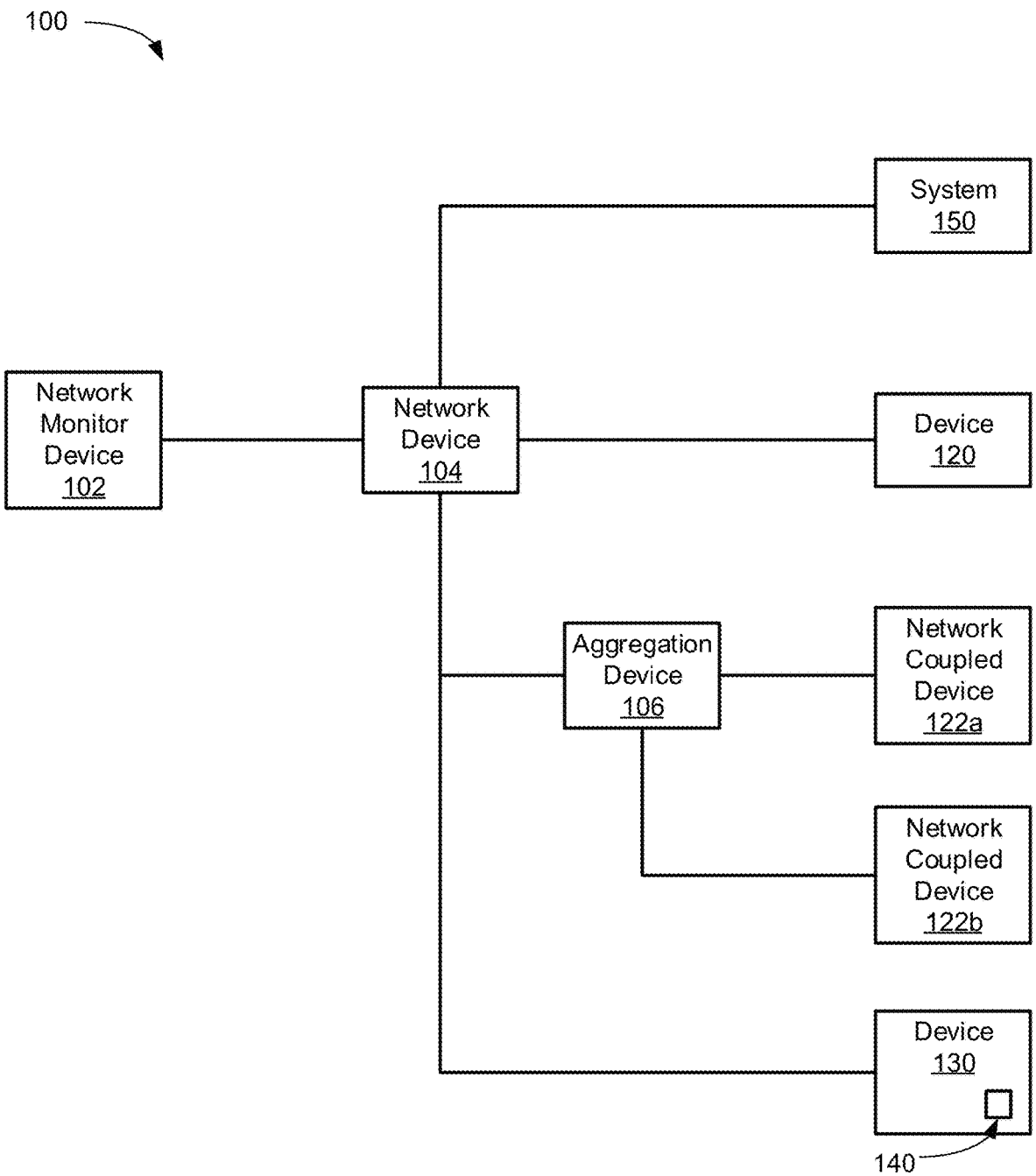
FIG. 1 depicts an illustrative communication network in accordance with one implementation of the present disclosure.

Aspects and implementations of the present disclosure are directed to dynamic segmentation management. The systems and methods disclosed can be employed with respect to network security, among other fields. More particularly, it can be appreciated that devices with vulnerabilities are a significant and growing problem. At the same time, the proliferation of network-connected devices (e.g., internet of things (IoT) devices such as televisions, security cameras, wearable devices, medical devices, etc.) can make it difficult to effectively ensure that network security is maintained. Accordingly, described herein in various implementations are systems, methods, techniques, and related technologies, which dynamically segment one or more networks so that compromised device communication can be limited to ensure that the impact of the compromised device is reduced and one or more actions can be taken.

Network segmentation can be used to enforce security policies on a network, for instance in large and medium organizations, by restricting portions or areas of a network which a device can access or communicate with. Segmentation or "zoning" can provide effective controls to limit movement across the network (e.g., by a hacker or malicious software). Enforcement points including firewalls, routers, switches, cloud infrastructure, other network devices, etc. may be used to enforcement segmentation of a network and different address subnets may be used for each segment. Enforcement points may enforce segmentation by filtering or dropping packets according to the network segmentation. The viability of a network segmentation project depends on the quality of visibility the organization has into its devices and the traffic flowing between the devices.

Historically, networks were planned and architected in a static manner, meaning each type of user, device, or application on the network has its own range of IP addresses. In addition, networks were historically flat due to ongoing connectivity of users and that made segmentation a very hard project to execute. Even when subnets were used the IP addresses and roles were statically mapped (e.g., 10.10.10.0/24 mapped to servers). This methodology served network engineers well for the last 20 years. Traditionally networks were segmented or built statically and hierarchically and static segmentation tools were used. Each environment or subnet on the network would have its own functionality. In other words, the segment that a device is part of is based on the IP address of the device. Segmentation done on an IP address basis is fixed or static in manner and is based on more traditional network topologies or organization of devices. Based on the functionality of that static segment, there would be defined segmentation rules that are usually done with static access control lists (ACLs) on routers or firewalls. There is little to no opportunity to be dynamic with the segmentation under such as static policy.

The efficiency and functionality of this model has been challenged in the past several years by the trends of bring your own device (BYOD), internet of things (IoT), virtualization, and elasticity. Further, the mobility of users and devices presents a major challenge for corporate networks to provide efficiency and functionality while being secure. Traditional segmentation methodologies are not well suited for the elasticity in the number of devices and types of devices.

With BYOD, a user is allowed to bring his or her own device onto a network, and IoT, the number and type of devices on a corporate network, which used to be predicable and contained, is now unpredictable and exponentially growing. BYOD results in a highly dynamic number of devices. IoT has led to a dramatic rise in the number of devices as well as the variety of devices. The rapid increase in IoT devices is growing and segmentation is one of the most efficient way to contain the threat of compromise of IoT devices and reduce the attack surface around IoT devices. Pre-defined IP ranges can no longer accommodate the needs, as in most cases there is no way to accurately predicted the number of devices of each type that will appear on the network. In addition, it is very hard to segment an existing flat network from scratch as such a procedure can be disruptive to an organization.

With virtualization and the large increase in elasticity, entities or systems on the network are no longer static physical boxes that sit in the data center or other locations. Desktops and servers are increasingly shifting to a virtual, dynamic, and completely elastic model. This means that it is very difficult to determine an application, device type, or user from its IP address because a virtual server or desktop can appear in two different continents within a day with different IP addresses (while being seamless to an end user).

For example, a zone with a development server needs to be accessible by a group of research and development (R&D) users. The rapid increase in the number of devices and types of devices causes the defining of the large zone of characteristic functionality to no longer scale. Smaller zones could be used but then the network would be more flat and less structured with specific subnets. This becomes particularly problematic when internet protocol version 4 (IPv4) is used because as the number of devices increases the number of available addresses quickly runs out. The more IPv4 devices you have, the more IPv6, which has a larger address space, is needed, and IPv6 has its own implementation challenges.

Segmentation is often done by applying a tag to a device based on the IP scheme. The determination and application of tags to devices is manual. The manual nature of the tagging limits the effectiveness of the segmentation and in some cases even the viability of a segmentation project. For example, a segmentation scheme may indicate that devices in a 10.10.10.x subnet are applications servers and thus each server with an IP address in the 10.10.10.x subnet is assigned an application tag. The tags are thus statically mapped to a device based on IP address.

If a device is assigned a tag based solely on the IP address if the IP address does not match the segmentation scheme, then a device may be tagged with a tag that does not properly match the segmentation scheme. For example, if a printer gets an IP address that is associated with an IP camera segment, then the printer may be restricted from operating properly by being preventing from communicating with user devices such as laptops and desktops.

Security products intended to keep networks safe and secure can no longer rely on static IP address schemes as in the last 20 years. Decisions and actions stemming from these products is gradually becoming irrelevant and misleading. Thus, what is needed is a granular, adaptive, and flexible solutions that are agnostic to the IP addressing scheme.

An entity or entities, as discussed herein, include devices (e.g., computer systems, for instance laptop, desktop, servers, mobile devices, IoT devices, OT devices, etc.), endpoints, virtual machines, services, serverless services (e.g., cloud based services), containers (e.g., user-space instances that work with an operating system featuring a kernel that allows the existence of multiple isolated user-space instances), cloud based storage. Depending on the entity, an entity may have an IP address (e.g., a device) or may be without an IP address (e.g., a serverless service). Embodiments are able to dynamically segment various entities, as described herein.

Embodiments provide an end to end dynamic policy based segmentation policy or segmentation filter to assign tags to an entity in real-time based on dynamic entity characteristics and not merely the IP address. Embodiments provide segmentation based not on IP schemes (e.g., devices of a particular functionality are in a particular subnet) and environment but rather on the characteristics of the entity itself. The segmentation is thus based on the device or entity (and possibly the user and one or more services being used) instead of the IP scheme or the IP address of the device or entity.

Embodiments are operable to dynamically tag an entity based on a variety of properties or characteristics of the entity (e.g., in real-time). The tagging may be done automatically (e.g., without user intervention) based on a policy. Such dynamic tagging of an entity removes the need to manually tag entities thereby advantageous removing a significant time burden from administrators. For example, manual tagging based on the name of entities having a location indicator (e.g., the name starting with 'A' corresponding to America or the United States of America or a network addressing scheme) can be done automatically.

For example, a device that is classified, identified, or a combination thereof as a printer can be tagged with a printer device tag. Similarly, a device that is classified, identified, or a combination thereof as an IP camera can be tagged an IP camera device tag. In both examples, the tagging is based on the categorization (e.g., classification, identification, etc., or a combination thereof) instead of based solely on the IP address of the printer or IP camera.

The tagging of an entity is done without an agent or in an agentless manner thereby allowing tagging each entity on one or more networks. Many devices, IoT devices in particular, have limited processing, storage, and other resources that restrict the ability of an agent to be installed on the device. Further, it is not practical to develop an agent for each device or entity because of the large variety of different devices and the rapid increase in the number of devices. In addition, the combination of agentless operation and dynamic tagging by embodiments, enables one or more tags to be assigned to an entity without being subject to development and release timelines for an agent or if an agent does not work properly. Thus, the ability to agentlessly categorize and tag entities allow a wide variety of entities to by dynamically tagged and one or more segmentation policies to be rapidly applied (e.g., without any preliminary requirements such as under 802.1x). In some embodiments, 802.1x and similar protocols are supported.

Embodiments are operable to assign or apply multiple tags to an entity. Embodiments can assign tags based on a fingerprint, entity behavior, compliance, location, operating system, application (e.g., billing application), user, user department, patch status (e.g., whether or not a device is patched), manufacturer, vendor, etc. Each property or characteristic of an entity may define a tag and thus a zone, group, or category for the entity. Embodiments are thus able to tag and segment entities in real-time to facilitate an accurate segmentation and segments can be assigned hierarchically. For example, a high, root, or parent level tag can be R&D and secondary tags can be one or more location (e.g., city and country), compliance tags, sensitivity or criticality tags, risk tags, environment tags (e.g., production, development, demilitarized zone (DMZ)), network connection type tags (wireless, wired, remote), etc. In some embodiments, more than one high level tag is supported.

Embodiments are further able to categorize an entity based on an end to end communication basis and based on multiple properties, multiple fingerprints, or characteristics. Embodiments have access (e.g., based on monitoring communications across a network) to both the source and destination of communications of an entity across any environment (e.g., campus, data center, cloud, etc.). Embodiments are thus able to adaptively, continuously, and in real-time categorize and tag entities automatically based on communications sent by the entity and an entity receiving the communications thereby overcoming the shortcomings of manual tagging and static segmentation.

Current methodologies are only able to see one end of a communication of an entity (point solutions) and thereby are unable to perform segmentation based on both ends of a communication. Further, current methodologies require that categorization be done manually for each specific environment (e.g., campus, data center, etc.). For example, if an IP camera is communicating with a server, an agent on the server would see only a data flow (e.g., video) coming from the IP camera but not know that it was an IP camera sending the data (e.g., and would be largely indistinguishable from other types of data streams, in particular if the stream is encrypted). Applying a segmentation policy to an unknown data stream and communication can have a high probability of being applied incorrectly, having negative impacts, or creating security risks.

With the categorization ability of embodiments, it is possible to know that the data is being sent from an IP camera to a server and thus a segmentation policy can be applied for both the server and IP camera. For example, the IP camera may be restricted from communicating with other entities (e.g., other IoT devices, or the Internet) as part of a segmentation based on the categorization of the IP camera. As another example, one or more MRI machines may communicate with a server that stores MRI data and by being able to see both end of the connections between the server and the MRI machines, the server can be categorized as an MRI server and segmentation dynamically applied to both ends of the server and the MRI machines.

Embodiments are able to dynamically categorize entities in real time, for any entities, users, and applications across a network (e.g., extended enterprise network). Based on a dynamic and adaptive policy framework and real time visibility into many fingerprints for each entity or device on the network, embodiments are able to tag and segment devices or entities in real time and thereby facilitate accurate and adaptive segmentation policy implementation.

In some embodiments, a categorization engine is dynamic and adaptive to the network in real time vs. static methodologies that are based on network configuration. Embodiments support dynamic segmentation in a variety of environments, including but not limited to, campus, IoT, datacenter, cloud, and operational technology (OT). In various embodiments, a network access control (NAC) device can act as a single point for managing segmentation across a network.

Embodiments are able to dynamically determine segmentation tags for each entity or device on a network, determine enforcement actions (e.g., rules, ACLs, etc.) for enforcement points (firewalls, routers, switches, etc.), and apply those enforcement actions to the enforcement points. Embodiments manage segmentation on a network and thus improve the efficacy of segmentation products including firewalls, routers, switches, and the like.

The dynamic nature of the segmentation management performed by embodiments allows the segmentation to be applied to be adaptive to business changes, threats, and changes in the threat landscape. For example, when a merger or acquisition business change occurs resulting in two networks being communicatively coupled for the first time, each entity may be categorized (e.g., without the need for an agent to be installed), tagged with one or more tags, and enforcement points updated with enforcement actions accordingly based on the tags.

With new threats or changes in the threat landscape, changes in a segmentation policy can be applied rapidly to update enforcement points. For example, if a new threat is found that involves compromised IP cameras communicating with a command and control server on the Internet, the segmentation policy can be updated with the IP address or domain name of the command and control server. Embodiments are then able to the update the enforcement points (e.g., one or more firewalls) on a network to segment or prevent devices tagged as IP cameras from communicating with the command and control server.

Accordingly, described herein in various implementations are systems, methods, techniques, and related technologies, which perform segmentation management based on one or more entity characteristics. As described herein, various techniques can be used to configure enforcement of enforcement points based on the entity characteristics.

It can be appreciated that the described technologies are directed to and address specific technical challenges and longstanding deficiencies in multiple technical areas, including but not limited to network security, monitoring, and policy enforcement. It can be further appreciated that the described technologies provide specific, technical solutions to the referenced technical challenges and unmet needs in the referenced technical fields.

FIG. 1 depicts an illustrative communication network 100, in accordance with one implementation of the present disclosure. The communication network 100 includes a network monitor device 102, a network device 104, an aggregation device 106, a system 150, devices 120 and 130, and network coupled devices 122a-b. The devices 120 and 130 and network coupled devices 122a-b may be any of a variety of devices including, but not limited to, computing systems, laptops, smartphones, servers, Internet of Things (IoT) or smart devices, supervisory control and data acquisition (SCADA) devices, operational technology (OT) devices, campus devices, data center devices, edge devices, etc. It is noted that the devices of communication network 100 may communicate in a variety of ways including wired and wireless connections and may use one or more of a variety of protocols.

Network device 104 may be one or more network devices configured to facilitate communication among aggregation device 106, system 150, network monitor device 102, devices 120 and 130, and network coupled devices 122a-b. Network device 104 may be one or more network switches, access points, routers, firewalls, hubs, etc.

Network monitor device 102 may be operable for a variety of tasks including segmentation management, as described herein. The segmentation management may be based on a segmentation policy and network monitor device 102 determines and implements the segmentation of the network (e.g., based on assigning one or more tags to each entity) based on the segmentation policy. The segmentation management can include selecting an entity (e.g., based on a device being detected communicatively coupling to the network or being selected as part of a periodic scan), determining one or more characteristics of the entity, assigning one or more tags to the entity, and assigning enforcement actions to enforcement points (e.g., firewall, router, switch, etc.) to implement a segmentation policy based on other tags, as described herein. The enforcement actions may be assigned or configured on the enforcement points using an application programming interface (API), command line interface (CLI), a simple network management protocol (SNMP) interface, or a combination thereof. In some embodiments, the segmentation management is performed without an agent installed on the entity or device.

Network monitor device 102 may further perform a variety of functions including identification, classification, and taking one or more remediation actions (e.g., changing network access of the entity, change the virtual local area network (VLAN), send an email, short message service (SMS), etc.). Entity identification, classification, or combination thereof may be used to determine one or more tags to be associated with the entity which in turn are used to determine how to configure enforcement points, as described herein.

An enforcement point that is a router, firewall, switch, hypervisor, software-defined networking (SDN) controller, virtual firewall, or other network device or infrastructure that may have an ACL like policy to apply based on the IP of an entity. A next generation firewall can be updated with an ACL like policy regarding an entity accessing the Internet. Cloud infrastructure (e.g., AWS security groups) can be updated to drop packets from the IP of the entity that have a destination outside the cloud. Three different enforcement actions (e.g., a router ACL, a NGFW ACL, and a cloud infrastructure security group packet filtering ACL) can thus be applied to three different enforcement points (e.g., a router, a NGFW, and cloud infrastructure). Enforcement actions can be applied in each tier (e.g., campus enforcement points, data center enforcement points, cloud enforcement points) across different network tiers.

In some embodiments, if the categorization functionality is being updated (e.g., which could result in a change in one or more tags that are assigned to an entity and thus impact the enforcement of segmentation by the enforcement points), notifications may be sent (e.g., via email or other methods as described herein) or presented to a user (e.g., via a graphical user interface (GUI)) to indicate that the categorization of one or more entities is changing and should be confirmed before enforcement points are updated based on the changed categorization. After conformation, the tags may be changed.

Network monitor device 102 may be a computing system, network device (e.g., router, firewall, an access point), network access control (NAC) device, intrusion prevention system (IPS), intrusion detection system (IDS), deception device, cloud-based device, virtual machine based system, etc. Network monitor device 102 may be communicatively coupled to the network device 104 in such a way as to receive network traffic flowing through the network device 104 (e.g., port mirroring, sniffing, acting as a proxy, passive monitoring, etc.). In some embodiments, network monitor device 102 may include one or more of the aforementioned devices. In various embodiments, network monitor device 102 may further support high availability and disaster recovery (e.g., via one or more redundant devices).

In some embodiments, network monitor device 102 may monitor a variety of protocols (e.g., Samba, hypertext transfer protocol (HTTP), secure shell (SSH), file transfer protocol (FTP), transfer control protocol/internet protocol (TCP/IP), user datagram protocol (UDP), Telnet, HTTP over secure sockets layer/transport layer security (SSL/TLS), server message block (SMB), point-to-point protocol (PPP), remote desktop protocol (RDP), windows management instrumentation (WMI), windows remote management (WinRM), etc.).

The monitoring of entities by network monitor device 102 may be based on a combination of one or more pieces of information including traffic analysis, information from external or remote systems (e.g., system 150), communication (e.g., querying) with an aggregation device (e.g., aggregation device 106), and querying the entity itself (e.g., via an API, CLI, or web interface), which are described further herein. Network monitor device 102 may be operable to use one or more APIs to communicate with aggregation device 106, device 120, device 130, or system 150. Network monitor device 102 may monitor for or scan for entities that are communicatively coupled to a network via a NAT device (e.g., firewall, router, etc.) dynamically, periodically, or a combination thereof.

Information from one or more external or 3$^{rd}$ party systems (e.g., system 150) may further be used for determining one or more tags for an entity. For example, a vulnerability assessment (VA) system may be queried to verify or check if an entity is in compliance and provide that information to network monitor device 102. External or 3$^{rd}$ party systems may also be used to perform a scan or a check on an entity to determine a software version.

Device 130 can include agent 140. The agent 140 may be a hardware component, software component, or some combination thereof configured to gather information associated with device 130 and send that information to network monitor device 102. The information can include the operating system, version, patch level, firmware version, serial number, vendor (e.g., manufacturer), model, asset tag, software executing on an entity (e.g., anti-virus software, malware detection software, office applications, web browser(s), communication applications, etc.), services that are active or configured on the entity, ports that are open or that the entity is configured to communicate with (e.g., associated with services running on the entity), media access control (MAC) address, processor utilization, unique identifiers, computer name, account access activity, etc. The agent 140 may be configured to provide different levels and pieces of information based on device 130 and the information available to agent 140 from device 130. Agent 140 may be able to store logs of information associated with device 130. Network monitor device 102 may utilize agent information from the agent 140. While network monitor device 102 may be able to receive information from agent 140, installation or execution of agent 140 on many entities may not be possible, e.g., IoT or smart devices.

System 150 may be one or more external, remote, or third party systems (e.g., separate) from network monitor device 102 and may have information about devices 120 and 130 and network coupled devices 122a-b. System 150 may include a vulnerability assessment (VA) system, a threat detection (TD) system, endpoint management system, a mobile device management (MDM) system, a firewall (FW) system, a switch system, an access point system, etc. Network monitor device 102 may be configured to communicate with system 150 to obtain information about devices 120 and 130 and network coupled devices 122a-b on a periodic basis, as described herein. For example, system 150 may be a vulnerability assessment system configured to determine if device 120 has a computer virus or other indicator of compromise (IOC).

The vulnerability assessment (VA) system may be configured to identify, quantify, and prioritize (e.g., rank) the vulnerabilities of an entity. The VA system may be able to catalog assets and capabilities or resources of an entity, assign a quantifiable value (or at least rank order) and importance to the resources, and identify the vulnerabilities or potential threats of each resource. The VA system may provide the aforementioned information for use by network monitor device 102.

The advanced threat detection (ATD) or threat detection (TD) system may be configured to examine communications that other security controls have allowed to pass. The ATD system may provide information about an entity including, but not limited to, source reputation, executable analysis, and threat-level protocols analysis. The ATD system may thus report if a suspicious file has been downloaded to a device being monitored by network monitor device 102.

Endpoint management systems can include anti-virus systems (e.g., servers, cloud based systems, etc.), next-generation antivirus (NGAV) systems, endpoint detection and response (EDR) software or systems (e.g., software that record endpoint-system-level behaviors and events), compliance monitoring software (e.g., checking frequently for compliance).

The mobile device management (MDM) system may be configured for administration of mobile devices, e.g., smartphones, tablet computers, laptops, and desktop computers. The MDM system may provide information about mobile devices managed by MDM system including operating system, applications (e.g., running, present, or both), data, and configuration settings of the mobile devices and activity monitoring. The MDM system may be used get detailed mobile device information which can then be used for device monitoring (e.g., including device communications) by network monitor device 102.

The firewall (FW) system may be configured to monitor and control incoming and outgoing network traffic (e.g., based on security rules). The FW system may provide information about an entity being monitored including attempts to violate security rules (e.g., unpermitted account access across segments) and network traffic of the entity being monitored.

The switch or access point (AP) system may be any of a variety of network devices (e.g., network device 104 or aggregation device 106) including a network switch or an access point, e.g., a wireless access point, or combination thereof that is configured to provide an entity access to a network. For example, the switch or AP system may provide MAC address information, address resolution protocol (ARP) table information, device naming information, traffic data, etc., to network monitor device 102 which may be used to monitor entities and control network access of one or more entities. The switch or AP system may have one or more interfaces for communicating with IoT or smart devices or other devices (e.g., ZigBee™, Bluetooth™, etc.), as described herein. The VA system, ATD system, and FW system may thus be accessed to get vulnerabilities, threats, and user information of an entity being monitored in real-time which can then be used to determine a risk level of the entity.

Aggregation device 106 may be configured to communicate with network coupled devices 122a-b and provide network access to network coupled devices 122a-b. Aggregation device 106 may further be configured to provide information (e.g., operating system, entity software information, entity software versions, entity names, application present, running, or both, vulnerabilities, patch level, etc.) to network monitor device 102 about the network coupled devices 122a-b. Aggregation device 106 may be a wireless access point that is configured to communicate with a wide variety of devices through multiple technology standards or protocols including, but not limited to, Bluetooth™, Wi-Fi™, ZigBee™, Radio-frequency identification (RFID), Light Fidelity (Li-Fi), Z-Wave, Thread, Long Term Evolution (LTE), Wi-Fi™ HaLow, HomePlug, Multimedia over Coax Alliance (MoCA), and Ethernet. For example, aggregation device 106 may be coupled to the network device 104 via an Ethernet connection and coupled to network coupled devices 122a-b via a wireless connection. Aggregation device 106 may be configured to communicate with network coupled devices 122a-b using a standard protocol with proprietary extensions or modifications.

Aggregation device 106 may further provide log information of activity and properties of network coupled devices 122a-b to network monitor device 102. It is appreciated that log information may be particularly reliable for stable network environments (e.g., where the types of devices on the network do not change often). The log information may include information of updates of software of network coupled devices 122a-b.

Figure 2:
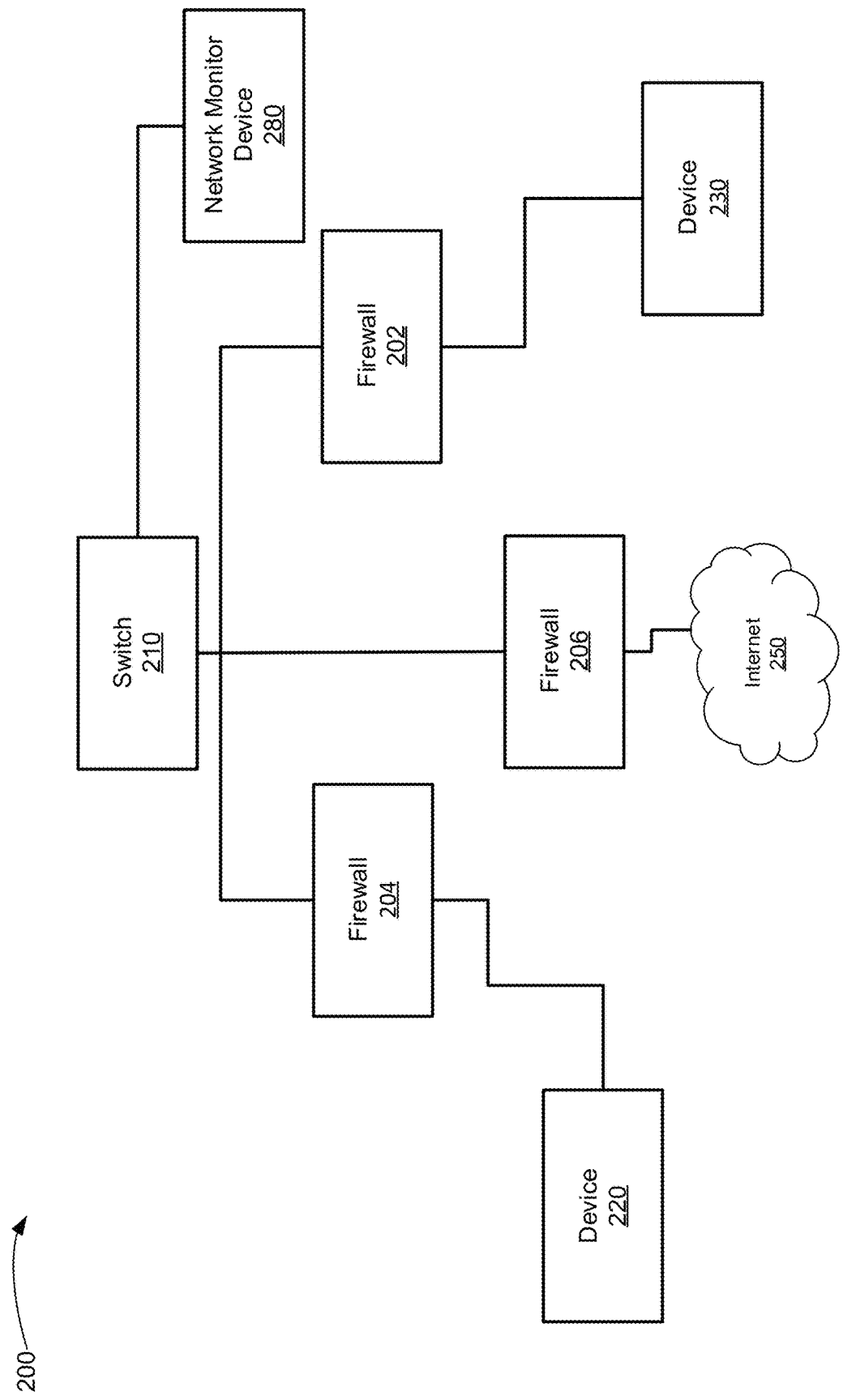
FIG. 2 depicts an illustrative network topology in accordance with one implementation of the present disclosure.

FIG. 2 depicts an illustrative network topology in accordance with one implementation of the present disclosure. FIG. 2 depicts an example network 200 with a variety of address configurations in which a network monitor device 280 (e.g., network monitor device 102) may handle segmentation management, assign one or more tags based on one or more characteristics of an entity, and assign enforcement actions to the enforcement points to implement a segmentation policy. FIG. 2 show example network devices 202-230 and it is appreciated that more or fewer network devices or other entities may be used in place of network devices of FIG. 2. For example, firewalls 202-206 may be any entity that is operable to allow traffic to pass, drop packets or restrict traffic. Network monitor device 280 may be any of a variety of network devices, e.g., router, firewall, an access point, network access control (NAC) device, intrusion prevention system (IPS), intrusion detection system (IDS), deception device, cloud-based device, virtual machine based system, etc. Network monitor device 280 may be substantially similar network monitor device 102. Embodiments support IPv4, IPv6, and other addressing schemes.

Switch 210 communicatively couples the devices of network 200 including firewalls 202-206 and network monitor device 280. Firewalls 202-206 may perform network address translation (NAT) and firewalls 202-204 communicatively couple the devices 220-230 which are behind the firewalls. Firewall 206 communicatively couples network 200 to Internet 250 and firewall 206 may restrict or allow access to Internet 250 based on particular rules or ACLs configured on firewall 206. Firewalls 202-206 are thus enforcement points, as described herein.

Network monitor device 280 is configured to identify, classification, determine characteristics of entities (e.g., devices 220-230), or a combination thereof on network 200, as described herein. Network monitor device 280 is configured to determine one or more tags based the characteristics of devices 220-230. The tags can include a compliance tag (e.g., whether the entity is in compliance with a policy), a firewall tag (e.g., which resources or areas the entity is permitted to communicate with based on a firewall), a location tag (e.g., the location, for instance fifth floor, or the department, for instance, accounting department), an access control list (ACL) tag (e.g., which resources or areas the entity is permitted to communicate with), a department tag, a user tag (e.g., which user is logged into the entity), or an account tag (e.g., which account(s) are associated with the entity).

Based on the tags, network monitor device 280 is operable to determine a zone based on the tags determined for an entity. For example, if device 230 has an accounting department tag, a California office tag, a second floor tag, a wireless tag, a lab environment tag, the zone may be a wireless California office lab zone.

Based on the zone, network monitor device 280 is operable to determine enforcement points associated with the determined zone. For example, if device 230 is an accounting department device, switch 201 and firewalls 206 and 202 may be determined to be enforcement points associated with the zone determined for device 220.

Network monitor device 280 may further configure enforcement actions on firewalls 204-206 based on the scan of devices of network 200, as described herein. Network monitor device 280, based on the enforcement points, can assign enforcement actions to enforcement points. Referring to the example above, a NGFW configuration action may be assigned to firewall 206 to allow device 230 to access the internet using HTTP ports only. Firewall 202 and switch 210 may be assigned enforcement actions (e.g., ACLs) to allow device 230 to access other accounting resources (e.g., file shares, email servers, application servers, etc.).

As another example, if device 220 is an application server and device 230 is a desktop machine in an engineering department, network device monitor 280 may determine characteristics of devices 220-230 based on the end to end communications between the devices (e.g., without an agent on either of devices 220-230). Network device monitor 280 may determine that device 220 is a server running a collaboration application (e.g., based on analysis of packets and behavior of device 220) and that device 230 is a client of server device 220. Network monitor device 280 may then determine a server tag, a collaboration application tag for device 220. Network monitor device 280 may then assign enforcement actions to firewalls 202-204 to allow communications between device 220 and device 230 based on the server tag and the collaboration application tag. Network monitor device 280 may further assign enforcement actions to firewall 206 to prevent device 220 from communicating with Internet 250.

Network monitor device 280 may determine a client tag, a collaboration client tag for device 230. Network monitor device 280 may then assign enforcement actions to firewalls 202-204 to allow communications between device 220 and device 230 based on the client tag and the client collaboration tag. Network monitor device 280 may further assign enforcement actions to firewall 206 to prevent device 230 from communicating with Internet 250.

Figure 3:
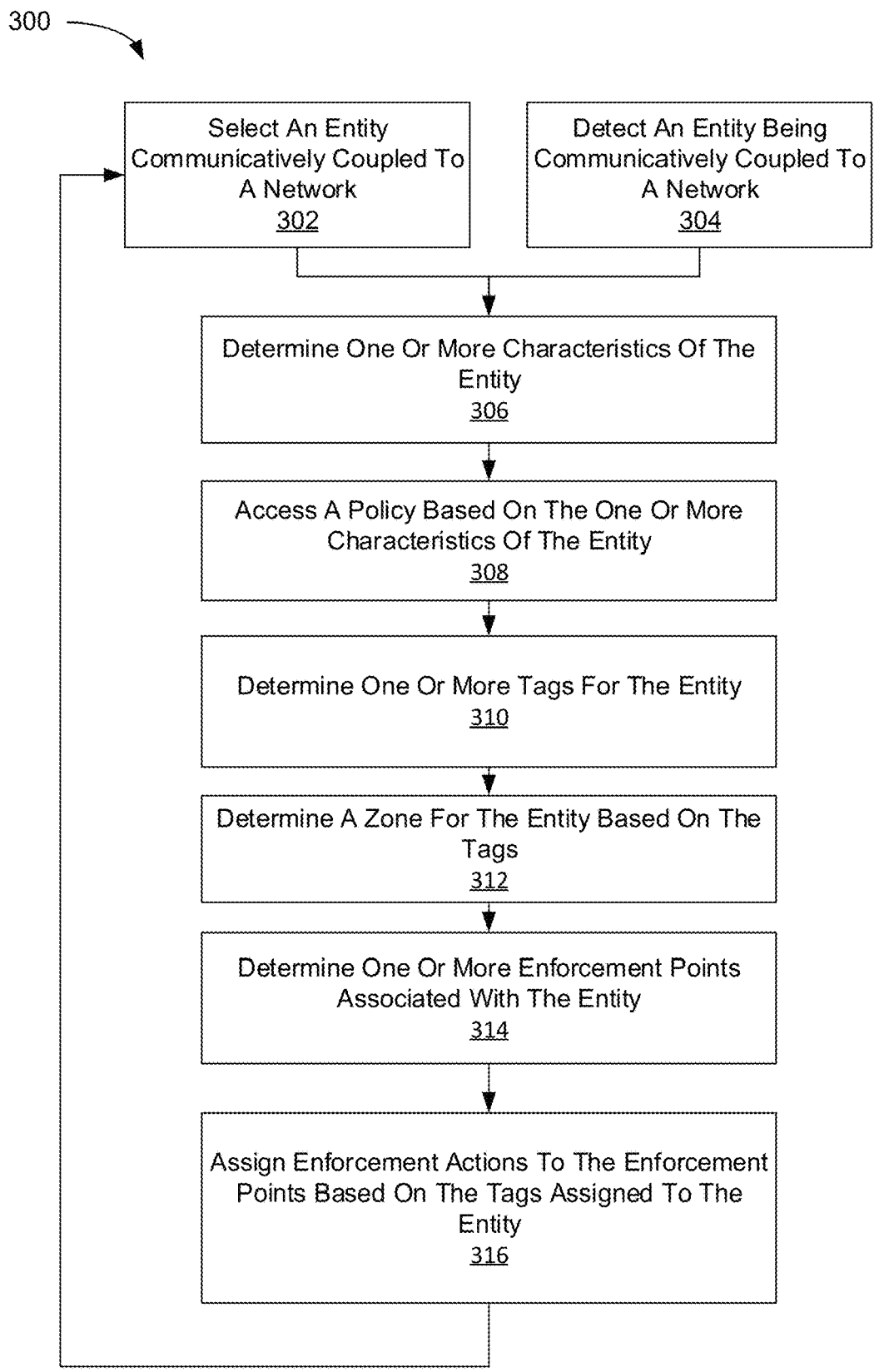
FIG. 3 depicts a flow diagram of aspects of a method for dynamic segmentation in accordance with one implementation of the present disclosure.

With reference to FIG. 3, flowchart 300 illustrates example functions used by various embodiments. Although specific function blocks ("blocks") are disclosed in flowchart 300, such blocks are examples. That is, embodiments are well suited to performing various other blocks or variations of the blocks recited in flowchart 300. It is appreciated that the blocks in flowchart 300 may be performed in an order different than presented, and that not all of the blocks in flowchart 300 may be performed.

FIG. 3 depicts a flow diagram of aspects of a method for dynamic segmentation in accordance with one implementation of the present disclosure. Various portions of flowchart 300 may be performed by different components (e.g., components of system 400) of an entity (e.g., network monitor device 102). Flowchart 300 depicts a process for selecting an entity and dynamically applying a segmentation policy to the entity.

At block 302, an entity communicatively coupled to a network is selected. The entity may be selected as part of a periodic scan of the network (e.g., a scan of network 100 by network monitoring device 102). The entity may further be selected as part of a continuous, real-time, or combination thereof scan of the network.

At block 304, an entity being communicatively coupled to a network is detected. The entity may be detected upon being communicatively coupled to the network (e.g., being communicatively coupled to network device 104). The detecting of the entity coupled to the network may include detecting the entity in response to the entity being recoupled or readmitted to the network.

At block 306, one or more characteristics of the entity is determined. The one or more characteristics may be collected or accessed from various of sources including, from the entity, from the environment, network devices (e.g., one or more switches, routers, firewalls, etc.) and any other device or resource communicatively coupled to the network (e.g., network 100) including other systems (e.g., system 150). The one or more characteristics may include classification, identification, categorization, or a combination thereof which may be based on fingerprints, entity behavior, etc., as described herein. Embodiments are able to determine the one or more characteristics of the entity agentlessly thereby allowing characteristics of an entity to be quickly determined for entities that do not have or support an agent as well as without needing an agent to be installed for entities that do support an agent. In some embodiments, the one or more characteristics are determined in real-time.

At block 308, a policy is accessed based on the one or more characteristics of the entity. One or more policies may be accessed and any of the one or more policies that apply based on the one or more characteristics of the entity can be accessed. For example, a policy can be access based on the operating system of the entity such that a policy specific to the particular operating system of the entity is accessed.

At block 310, one or more tags for the entity are determined. The tags are determined based on the characteristics of the entity, as described herein. In some embodiments, a policy engine evaluates each of the properties or characteristics associated with an entity to determine one or more tags to be assigned to the entity. The policy may be used to determine one or more tags for an entity continuously and in real time. For example, a compliance tag may be determined based on an antivirus scan that is specified in the policy.

At block 312, a zone or segment for the entity is (optionally) determined based on the tags. The zone for an entity is associated with the security permissions or restrictions that are associated a particular entity as part of a segmentation policy. For example, an accounting server may be determined to be in a non-Internet zone meaning that it cannot access the Internet because of the sensitive data stored on the accounting server.

At block 314, one or more enforcement points associated with the entity is determined. The enforcement points may be determined based on the zone associated with the entity, the one or more tags associated with the entity, or a combination thereof. The enforcement points may be one or more network devices (e.g., firewalls, routers, switches, hypervisor, SDN controller, virtual firewall, etc.) that are able to enforce rules, ACLs, or the like to control (e.g., allow or deny) communication and network traffic between the entity and one or more other entities communicatively coupled to a network.

At block 316, enforcement actions are assigned to the enforcement points based on the tags assigned to the entity. The enforcements actions may be determined based on the segmentation policy, e.g., preventing communication beyond an enforcement point, restricting the ports or protocols that may be used, etc. Embodiments may use an application programming interface (API) or a command line interface (CLI), simple network management protocol (SNMP) interface, etc., to assign, configure, or a combination thereof to assign or configure the enforcement actions to the enforcement points.

For example, if an entity is a Windows™ device on a third floor, the device will be tagged with a third floor tag, and the enforcement points on the third floor are configured (e.g., via ACLs) to allow the device to communicate with resources available to a device on the third floor (e.g., servers, printers, peer devices, etc., on the third floor) and a NGFW is configured to the allow the device to access the data center. A compliance tag could also be applied as long as the device is compliant with a compliance policy (e.g., anti-virus definitions are up to date, no malware is present on the device, operating system and application patches applied or updated, etc.). If the device is found to be non-compliant, e.g., after failing an anti-virus scan, a non-complaint anti-virus tag may be applied to the device, which causes the enforcement points to only allow the device to communicate with anti-virus definitions or updates servers or substantially restrict communication thereto.

Embodiments thus support heterogeneous enforcement methods, allowing different enforcement actions or replacement of enforcement actions based on the multiple tags applied to an entity. In other words, different enforcement actions can be applied based on each tag using multiple enforcement points. Embodiments can thus use a variety of different enforcement points (e.g., different segmentation products from different vendors) to dynamically apply segmentation to a particular entity. Further, embodiments support multiple different actions being applied to communications of the entity in parallel.

Block 302 may then be performed as part of a continuous, real-time, or combination thereof monitoring of the network to dynamically segment entities on the network. Block 304 may also be performed each time an entity communicatively coupled to the network (e.g., new devices and returning devices).

Figure 4:
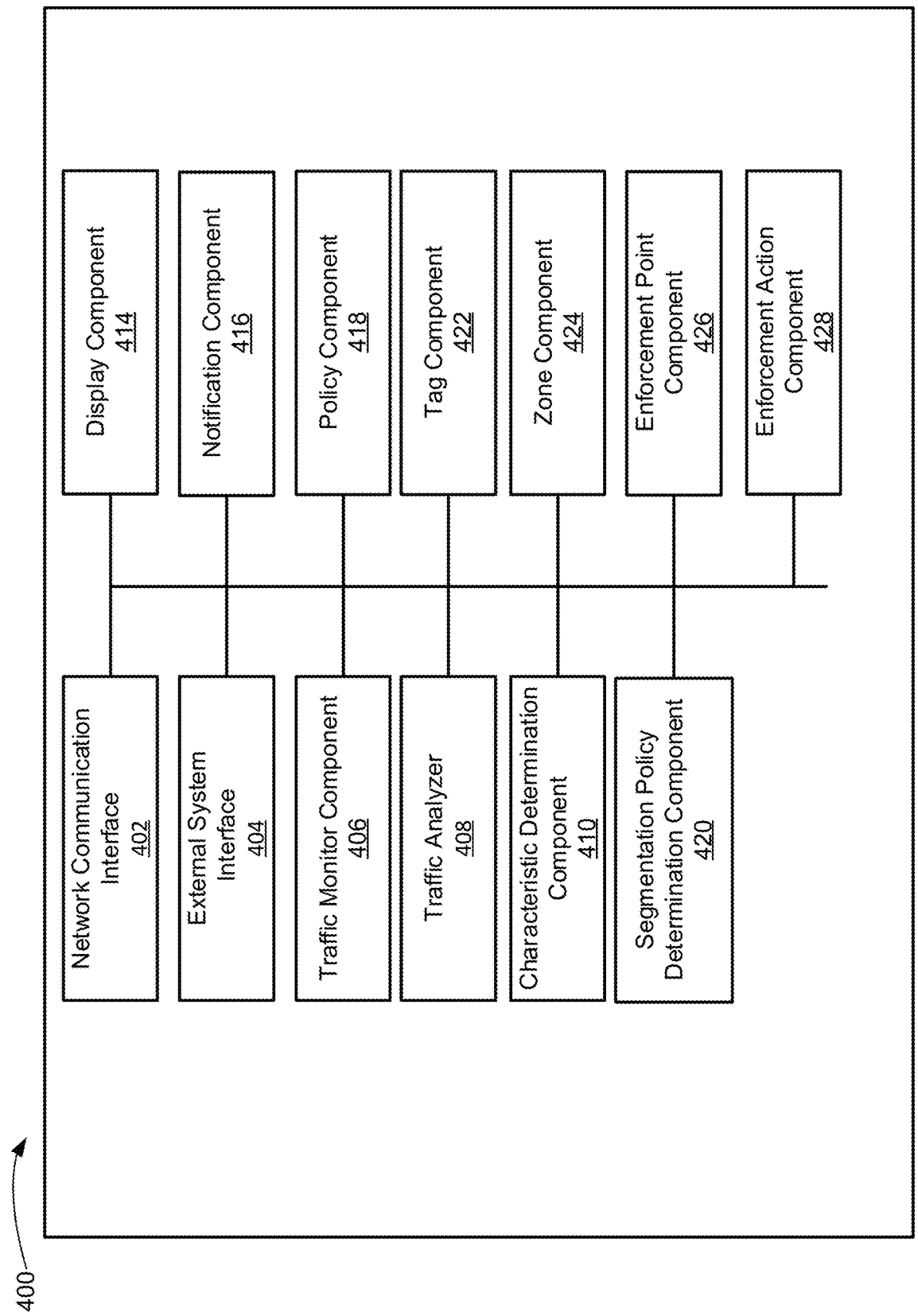
FIG. 4 depicts illustrative components of a system for dynamic segmentation in accordance with one implementation of the present disclosure.

FIG. 4 illustrates example components used by various embodiments. Although specific components are disclosed in system 400, it should be appreciated that such components are examples. That is, embodiments are well suited to having various other components or variations of the components recited in system 400. It is appreciated that the components in system 400 may operate with other components than those presented, and that not all of the components of system 400 may be required to achieve the goals of system 400.

FIG. 4 depicts illustrative components of a system for dynamic segmentation in accordance with one implementation of the present disclosure. Example system 400 includes a network communication interface 402, an external system interface 404, a traffic monitor component 406, a traffic analyzer 408, characteristic determination component 410, segmentation policy determination component 412, a network session information analyzer 410, a scanning component 412, a display component 414, a notification component 416, a policy component 418, segmentation policy determination component 420, tag component 422, zone component 424, enforcement point component 426, and enforcement action component 428. The components of system 400 may be part of a computing system or other electronic device (e.g., network monitor device 102) or a virtual machine and be operable to monitor and one or more entities communicatively coupled to a network. For example, the system 400 may further include a memory and a processing device, operatively coupled to the memory, which may perform the functions of or execute the components of system 400. The components of system 400 may access various data and characteristics associated with an entity (e.g., network communication information) and data associated with one or more entities. It is appreciated that the modular nature of system 400 may allow the components to be independent and allow flexibility to enable or disable individual components or to extend/upgrade components without affecting other components thereby providing scalability and extensibility. System 400 may perform one or more blocks of flow diagram 300.

Communication interface 402 is operable to communicate with one or more entities (e.g., network device 104) coupled to a network that are coupled to system 400 and receive or access information about entities (e.g., entity communications, entity characteristics, etc.), as described herein. The communication interface 402 may be operable to work with one or more components to initiate access to characteristics about an entity to allow determination of one or more tags and assigning actions based on the tags or one or more enforcement points, as described herein.

External system interface 404 is operable to communicate with one or more third party, remote, or external systems to access information including characteristics about an entity. External system interface 404 may further store the accessed information in a data store. For example, external system interface 404 may access information from a vulnerability assessment (VA) system to enable determination of one or more compliance tags to be associated with the entity. External system interface 404 may be operable to communicate with a vulnerability assessment (VA) system, an advanced threat detection (ATD) system, a mobile device management (MDM) system, a firewall (FW) system, a switch system, an access point (AP) system, etc. External system interface 404 may query a third party system using an API or CLI. For example, external system interface 404 may query a firewall for information (e.g., network session information) about an entity or for a list of entities that are communicatively coupled to the firewall and communications associated therewith. In some embodiments, external system interface 404 may query a firewall or other system for information of communications associated with an entity.

Traffic monitor component 406 is operable to monitor network traffic to determine if a new entity has joined the network or an entity has rejoined the network and monitor traffic for analysis by traffic analyzer 408, as described herein. Traffic analyzer 408 is configured to perform analysis of network traffic (e.g., in real-time, with machine learning, etc.) to and from an entity thereby provide analysis of end to end communications of an entity. Traffic analyzer 408 may have a packet engine operable to access packets of network traffic (e.g., passively) and analyze the network traffic. The traffic analyzer 408 may be configured to perform active or passive traffic analysis or a combination thereof. The traffic analyzer 408 may further be able to access and analyze traffic logs from one or more entities (e.g., network device 104, system 150, or aggregation device 106) or from an entity being monitored. The traffic analyzer 408 may further be able to access traffic analysis data associated with an entity being monitored, e.g., where the traffic analysis is performed by a third party system.

Characteristic determination component 410 is configured to determine one or more characteristics of an entity, as described herein. The entity characteristics can then be stored and used by other components for performing segmentation management. Segmentation determination policy component 420 is configured to determine or select a segmentation policy based on the one or more characteristics of the entity, as described herein.

Display component 414 is configured to optionally display a graphical user interface or other interface (e.g., command line interface) for depicting various information associated with entities and segmentation, as described herein. In some embodiments, display component 414 may display or render a network graph of entities, tags associated with entities, and other segmentation information (e.g., if a categorization of the entity may be changing and segmentation may change).

Notification component 416 is operable to initiate one or more notifications based on the results of monitoring communications or characteristics of one or more entities and performing segmentation (e.g., when there has been a categorization change of an entity which will modify the segment the entity is associated therewith), as described herein. In some embodiments, when a compliance tag indicates that an entity is not compliant or the compliance tag has been removed, a notification may be sent indicating that the entity is no longer compliant. The notification may be any of a variety of notifications, e.g., IT ticket, email, SMS, a HTTP notification, etc., as described herein.

Policy component 418 is operable for initiating or triggering one or more remediation actions or security actions, as described herein. Policy component 418 may further be configured to perform other functions including checking compliance status, finding open ports, etc. Policy component 418 may restrict network access, signal a patch system or service, signal an update system or service, etc., as described herein. The policy component 418 may thus, among other things, invoke automatically patching, automatically updating, and automatically restrict network access of an entity (e.g., that has out-of-date software).

The actions may include restricting network access to a particular level (e.g., full, limited, or no network access), remediation actions (e.g., triggering patch systems or services, triggering update systems or services, triggering third party product action, etc.), informational actions (e.g., sending an email notification to a user or IT administrator or creating an IT ticket reflecting the level of compliance), and logging actions (e.g., logging or storing the compliance level).

Tag component 422 is configured to determine one or more tags to be assigned to an entity based on one or more characteristics of the entity and assign the one or more tags to the entity, as described herein. Zone component 424 is configured to determine a zone based on the one or more tags assigned to an entity, as described herein. Enforcement point component 426 is configured to determine one or more enforcement points (e.g., network devices) associated with the zone for the entity, as described herein. Enforcement action component 428 is configured to assign one or more enforcement actions to the one or more enforcement points based on the zone associated with the entity, as described herein.

The system 400 may be software stored on a non-transitory computer readable medium having instructions encoded thereon that, when executed by a processing device, cause the processing device to select an entity communicatively coupled to a network and determine one or more characteristics of the entity. The instructions may further cause the processing device to select a segmentation policy based on the one or more characteristics of the entity and determine one or more tags to be assigned to the entity based on the segmentation policy. The instructions may further cause the processing device to determine one or more enforcement points associated with the entity and assign one or more enforcement actions to the one or more enforcement points based on the zone associated with the entity.

In some embodiments, the one or more characteristics of the entities are determined without use of an agent. In various embodiments, the one or more enforcement points comprise at least one of a firewall, a router, a switch, a portion of cloud infrastructure, hypervisor, SDN controller, or virtual firewall. In some embodiments, the one or more tags comprises at least one of a compliance tag, a location tag, a department tag, a user tag, or an account tag. In various embodiments, the assigning of the one or more enforcement actions to the one or more enforcement points based on the zone associated with the entity comprises configuring one or more enforcement actions of each of the one or more enforcement points. In some embodiments, the enforcement actions are configured using at least one of an application programming interface (API), command line interface (CLI), or a simple network management protocol (SNMP) interface. In various embodiments, a tag of the one or more tags is associated with a respective enforcement action. In some embodiments, the determining one or more characteristics of the entity comprises determining at least one of a classification of the entity or an identification of the entity. In various embodiments, the determining one or more characteristics of the entity is based on at least a source and a destination of a communication of the entity. In some embodiments, the instructions may further cause the processing device to determine a zone for the entity based on the one or more tags.

Figure 5:
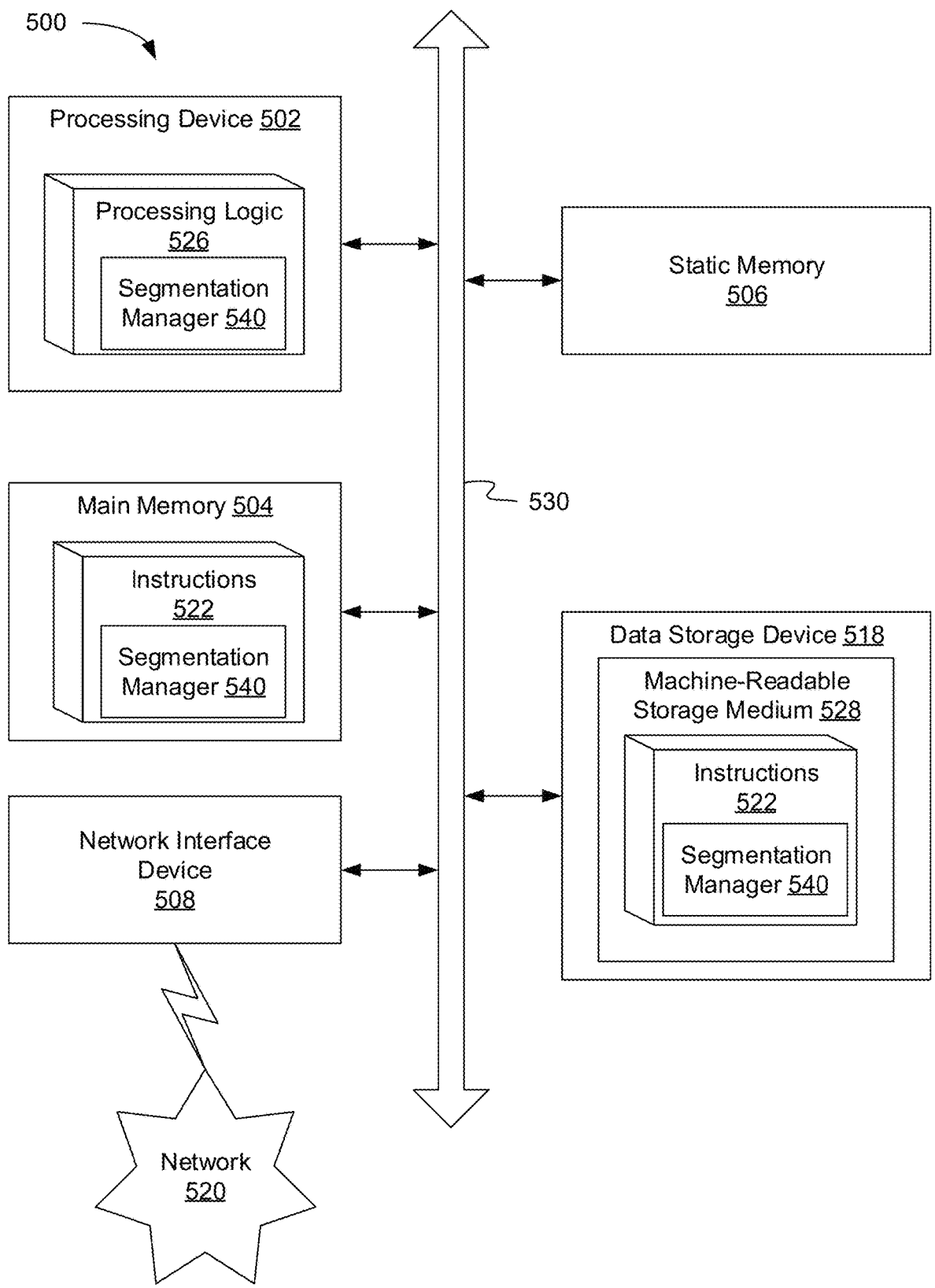
FIG. 5 is a block diagram illustrating an example computer system, in accordance with one implementation of the present disclosure.

FIG. 5 illustrates a diagrammatic representation of a machine in the example form of a computer system 500 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 500 may be representative of a server, such as network monitor device 102 running segmentation manager 140 to perform segmentation management, as described herein.

The exemplary computer system 500 includes a processing device 502, a main memory 504 (e.g., read-only memory (ROM), flash memory, dynamic random access memory (DRAM), a static memory 506 (e.g., flash memory, static random access memory (SRAM), etc.), and a data storage device 518, which communicate with each other via a bus 530. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute processing logic 526, which may be one example of segmentation manager 540 shown in FIG. 5, for performing the operations and steps discussed herein.

The data storage device 518 may include a machine-readable storage medium 528, on which is stored one or more set of instructions 522 (e.g., software) embodying any one or more of the methodologies of functions described herein, including instructions to cause the processing device 502 to execute segmentation manager 540. The instructions 522 may also reside, completely or at least partially, within the main memory 504 or within the processing device 502 during execution thereof by the computer system 500; the main memory 504 and the processing device 502 also constituting machine-readable storage media. The instructions 522 may further be transmitted or received over a network 520 via the network interface device 508.

The machine-readable storage medium 528 may also be used to store instructions to perform a method for managing segmentation, as described herein. While the machine-readable storage medium 528 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:
  selecting an entity communicatively coupled to a network;
  monitoring network traffic associated with the entity;
  determining, by a network monitor device, a classification of the entity based at least in part on the network traffic associated with the entity;
  selecting a segmentation policy based on the classification of the entity;
  applying a plurality of tags to the entity based on the segmentation policy;
  determining a zone for the entity based on the plurality of tags, wherein the zone is associated with a segment of the network associated with one or more of the plurality of tags, and wherein the zone is adaptive to changes in at least one of network topology or risk;
  determining a plurality of enforcement points associated with the entity based on the zone associated with the entity;

assigning a plurality of enforcement actions, based on the plurality of tags applied to the entity, to the plurality of enforcement points based on the zone associated with the entity;
determining that the segmentation policy has been updated;
determining that a topology of the network has changed;
dynamically updating the plurality of tags applied to the entity based on the change to the topology of the network; and
automatically updating the plurality of enforcement actions for the plurality of enforcement points based on the updated segmentation policy and the plurality of tags applied to the entity.

2. The method of claim 1, wherein the plurality of enforcement points comprises at least one of a firewall, a router, a switch, a portion of cloud infrastructure, hypervisor, software-defined networking (SDN) controller, or virtual firewall.

3. The method of claim 1, wherein the plurality of tags comprises at least one of a compliance tag, a firewall tag, a location tag, a department tag, a user tag, an account tag, or an environment tag.

4. The method of claim 1, wherein assigning the plurality of enforcement actions to the plurality of enforcement points comprises configuring one or more enforcement actions of each of the plurality of enforcement points.

5. The method of claim 1, wherein the plurality of enforcement actions are configured using at least one of an application programming interface (API), command line interface (CLI), or a simple network management protocol (SNMP) interface.

6. The method of claim 1, wherein a tag of the plurality of tags is associated with a respective enforcement action.

7. The method of claim 1, further comprising determining one or more characteristics of the entity from the network traffic.

8. The method of claim 7, wherein the determining one or more characteristics of the entity is based on at least a source and a destination of a communication of the entity.

9. The method of claim 8, wherein the one or more characteristics of the entity are determined without use of an agent.

10. A system comprising:
a memory; and
a processing device, operatively coupled to the memory, to:
select an entity communicatively coupled to a network;
monitor network traffic associated with the entity;
determine, by the system, one or more characteristics a classification of the entity based at least in part on the network traffic associated with the entity;
select a segmentation policy based on the classification of the entity;
determine a plurality of tags to the entity based on the segmentation policy;
determine a zone for the entity based on the plurality of tags, wherein the zone is associated with a segment of the network associated with one or more of the plurality of tags, and wherein the zone is adaptive to changes in at least one of network topology or risk;
determine a plurality of enforcement points associated with the entity based on the zone associated with the entity;
assign a plurality of enforcement actions, based on the plurality of tags applied to the entity, to the plurality of enforcement points based on the zone associated with the entity;
determine that the segmentation policy has been updated;
determine that a topology of the network has changed;
dynamically update the plurality of tags applied to the entity based on the change to the topology of the network; and
automatically update the plurality of enforcement actions for the plurality of enforcement points based on the updated segmentation policy and the plurality of tags applied to the entity.

11. The system of claim 10, wherein the plurality of enforcement points comprises at least one of a firewall, a router, a switch, a portion of cloud infrastructure, hypervisor, software-defined networking (SDN) controller, or virtual firewall.

12. The system of claim 10, wherein the plurality of tags comprises at least one of a compliance tag, a firewall tag, a location tag, an access control list (ACL) tag, a department tag, a user tag, or an account tag.

13. The system of claim 10, wherein assigning the plurality of enforcement actions to the plurality of enforcement points based on the zone associated with the entity comprises configuring the plurality of enforcement actions of each of the plurality of enforcement points.

14. The system of claim 10, wherein the plurality of enforcement actions is configured using at least one of an application programming interface (API), command line interface (CLI), or a simple network management protocol (SNMP) interface.

15. The system of claim 10, wherein a tag of the plurality of tags is associated with a respective enforcement action.

16. The system of claim 10, wherein the processing device is further to:
determine one or more characteristics of the entity from the network traffic.

17. The system of claim 10, wherein one or more characteristics of the entity are determined without use of an agent.

18. A non-transitory computer readable medium having instructions encoded thereon that, when executed by a processing device, cause the processing device to:
select an entity communicatively coupled to a network;
monitor network traffic associated with the entity;
determine, by the processing device, a classification of the entity based at least in part on the network traffic associated with the entity;
select a segmentation policy based on one or more characteristics of the entity;
determine a plurality of tags to the entity based on the segmentation policy;
determine a zone for the entity based on the plurality of tags, wherein the zone is associated with a segment of the network associated with one or more of the plurality of tags, and wherein the zone is adaptive to changes in at least one of network topology or risk;
determine a plurality of enforcement points associated with the entity based on the zone associated with the entity; and
assign a plurality of enforcement actions, based on the plurality of tags applied to the entity, to the plurality of enforcement points based on the zone associated with the entity;
determine that the segmentation policy has been updated;

determine that a topology of the network has changed;
dynamically update the plurality of tags applied to the entity based on the change to the topology of the network; and
automatically update the plurality of enforcement actions for the plurality of enforcement points based on the updated segmentation policy and the plurality of tags applied to the entity.

19. The non-transitory computer readable medium of claim 18, wherein one or more characteristics of the entity are determined without use of an agent.

* * * * *